US012748244B2

(12) United States Patent
Park et al.

(10) Patent No.: US 12,748,244 B2
(45) Date of Patent: Sep. 29, 2026

(54) META LENS AND OPTICAL APPARATUS INCLUDING THE SAME

(71) Applicant: SAMSUNG ELECTRONICS CO., LTD., Suwon-si (KR)

(72) Inventors: Hyunsung Park, Suwon-si (KR); Hyeonsoo Park, Seoul (KR); Seunghoon Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 536 days.

(21) Appl. No.: 18/224,990

(22) Filed: Jul. 21, 2023

(65) Prior Publication Data

US 2023/0358923 A1 Nov. 9, 2023

Related U.S. Application Data

(63) Continuation of application No. 17/039,068, filed on Sep. 30, 2020, now Pat. No. 11,747,524.

(Continued)

(30) Foreign Application Priority Data

Jun. 26, 2020 (KR) ........................ 10-2020-0078818

(51) Int. Cl.
*G02B 3/04* (2006.01)
*G02B 1/00* (2006.01)
(Continued)

(52) U.S. Cl.
CPC ............... *G02B 3/04* (2013.01); *G02B 1/002* (2013.01); *G02B 5/126* (2013.01); *G02B 1/14* (2015.01)

(58) Field of Classification Search
CPC .......................... G02B 1/002; G02B 2207/101
See application file for complete search history.

(56) References Cited

U.S. PATENT DOCUMENTS 9,134,510 B2 9/2015 Suzuki
9,946,051 B2 4/2018 Han et al.
(Continued)

FOREIGN PATENT DOCUMENTS

CN 107315206 A 11/2017
CN 108873121 A 11/2018
(Continued)

OTHER PUBLICATIONS

Chen et al., "A broadband achromatic metalens for focusing and imaging in the visible", Nature Nanotechnology, Mar. 2018, 8 total pages, vol. 13, doi:10.1038/s41565-017-0034-6.
(Continued)

*Primary Examiner* — Christopher Stanford
(74) *Attorney, Agent, or Firm* — Sughrue Mion, PLLC

(57) ABSTRACT

A meta lens includes a first lens surface, and a second lens surface provided opposite to the first lens surface, wherein at least one of the first lens surface and the second lens surface is a metasurface including a plurality of nanostructures having a sub-wavelength dimension that is less than a central wavelength $\lambda_0$ in an operation wavelength band of the meta lens, and wherein a deflection property of the first lens surface and a deflection property of the second lens surface based on positions of incident light are opposite to each other in at least some regions of each of the first lens surface and the second lens surface.

19 Claims, 20 Drawing Sheets

Related U.S. Application Data

(60) Provisional application No. 62/912,143, filed on Oct. 8, 2019.

(51) Int. Cl.

| | |
|---|---|
| ***G02B 5/126*** | (2006.01) |
| *G02B 1/14* | (2015.01) |

(56) References Cited

U.S. PATENT DOCUMENTS

| | | | | |
|---|---|---|---|---|
| 11,079,520 | B2 * | 8/2021 | Tsai | G02B 5/008 |
| 11,092,717 | B2 * | 8/2021 | Capasso | G02B 1/002 |
| 11,835,680 | B2 * | 12/2023 | Groever | G02B 1/002 |
| 2006/0087737 | A1 | 4/2006 | Choi et al. | |
| 2011/0170846 | A1 | 7/2011 | Sung et al. | |
| 2013/0146770 | A1 | 6/2013 | Jun et al. | |
| 2016/0306079 | A1 | 10/2016 | Arbabi et al. | |
| 2016/0316180 | A1 | 10/2016 | Han et al. | |
| 2017/0212285 | A1 | 7/2017 | Arbabi et al. | |
| 2018/0267270 | A1 | 9/2018 | Han et al. | |
| 2018/0299595 | A1 | 10/2018 | Arbabi et al. | |
| 2019/0154877 | A1 | 5/2019 | Capasso et al. | |
| 2020/0051263 | A1 | 2/2020 | Han et al. | |
| 2020/0174163 | A1 | 6/2020 | Han et al. | |
| 2020/0355913 | A1 | 11/2020 | Park et al. | |
| 2021/0014394 | A1 | 1/2021 | Han et al. | |
| 2021/0103075 | A1 | 4/2021 | Park et al. | |
| 2021/0132256 | A1 | 5/2021 | Park et al. | |
| 2021/0149081 | A1 | 5/2021 | Groever et al. | |
| 2022/0260754 | A1 | 8/2022 | Dobashi | |
| 2023/0148437 | A9 | 5/2023 | Han et al. | |

FOREIGN PATENT DOCUMENTS

| | | | |
|---|---|---|---|
| CN | 109799611 | A | 5/2019 |
| CN | 110161611 | A | 8/2019 |
| CN | 110376665 | A | 10/2019 |
| JP | 2014-112131 | A | 6/2014 |
| JP | 2019-516128 | A | 6/2019 |
| JP | 2019-519128 | A | 6/2019 |
| KR | 10-2006-0036234 | A | 4/2006 |
| KR | 10-2013-0064684 | A | 6/2013 |
| KR | 10-2016-0125875 | A | 11/2016 |
| KR | 10-2017-0112915 | A | 10/2017 |
| KR | 10-1846021 | B1 | 4/2018 |
| KR | 10-1905444 | B1 | 12/2018 |
| KR | 10-2019-0040681 | A | 4/2019 |
| KR | 10-2020-0129034 | A | 11/2020 |
| WO | 2017/176921 | A1 | 10/2017 |
| WO | 2018/204856 | A1 | 11/2018 |
| WO | 2019/164849 | A1 | 8/2019 |

OTHER PUBLICATIONS

Groever et al., "Supplementary Information for: Meta-Lens Doublet in the Visible Region", Nano Lett, Jun. 29, 2017, 11 total pages, doi:10.1021/acs.nanolett.7b01888.

Li et al., "Metalens-Based Miniaturized Optical Systems", Micromachines, 2019, 21 total pages, vol. 10, doi:10.3390/mi10050310.

Communication dated Oct. 27, 2023, issued by China National Intellectual Property Administration in Chinese Patent Application No. 202011184540.1.

Communication dated Oct. 27, 2023, issued by China National Intellectual Property Administration in Chinese Patent Application No. 202011037157.3.

Communication dated Oct. 27, 2023, issued by the China National Intellectual Property Administration in Chinese Application No. 202011184540.1.

Communication dated Apr. 29, 2024, issued by the Korean Patent Office in Korean Application No. 10-2020-0078818.

Arbabi et al., "Miniature optical planar camera based on a wide-angle metasurface doublet corrected for monochromatic aberration" Nature Communications, 2016, vol. 7, No. 13682, pp. 1-9 (9 pages total).

Chen Wei Ting et al: "Supplementary Video to A broadband achromatic metalens for focusing and imaging in the visible", Retrieved from the Internet: URL:https://static-content.springer.com/esm/art%3A10.1038%2Fs41565-017-0034-6/MediaObjects/41565_2017_34_MOESM2_ESM.mov.

Communication dated Mar. 12, 2021, from the European Patent Office in European Application No. 20202799.1.

Ehsan Arbabi et al., "Controlling the sign of chromatic dispersion in diffractive optics with dielectric metasurfaces", Optica, Jun. 2017, vol. 4, No. 6, pp. 625-632 (8 pages total).

J. Engelberg et al., "Near-IR wide field-of-view Huygens metalens for outdoor imaging applications", Jan. 22, 2019, pp. 1-21 (21 pages total).

Ke Li et al., "Dispersion controlling meta-lens at visible frequency", Optics Express, Sep. 4, 2017, vol. 25, No. 18, pp. 21419-21427 (9 pages total).

Mohammadreza Khorasaninejad et al., "Metalenses at visible wavelengths: Diffraction-limited focusing and subwavelength resolution imaging", Science, Jun. 3, 2016, vol. 352, No. 6290, pp. 1190-1194 (6 pages total).

Sajan Shrestha et al., "Broadband achromatic dielectric metalenses", Light: Science & Applications, Nov. 7, 2018, vol. 7, No. 85, pp. 1-11 (11 pages total).

Wei Ting Chen et al., "A broadband achromatic metalens for focusing and imaging in the visible", (manuscript), Jan. 1, 2018, pp. 1-30 (30 pages total).

Wei Ting Chen et al., "A broadband achromatic metalens for focusing and imaging in the visible", Supplemental Information for, Nature Nanotechnology, 2018, 16 pages total.

Introduction to Modular Transfer Function, May 28, 2018, Edmund Optics, Understanding MTF (Year: 2018).

Communication dated Mar. 13, 2023, issued by the European Patent Office in counterpart European Application No. 20198623.9.

Communication dated Feb. 19, 2021, issued by the European Patent Office in counterpart European Application No. 20198623.9.

He et al., "Polarization-insensitive meta-lens doublet with large view field in the ultraviolet region," Proceedings of SPIE, vol. 10841, 2019, Total 8 pages, XP060114959.

Li et al., "Metalens-Based Miniaturized Optical Systems," Micromachines 2019, vol. 10, No. 310, Jan. 2019, Total 21 pages, XP055791779, DOI: 10.3390/mi10050310.

Communication dated Oct. 29, 2024, issued by Japanese Patent Office in Japanese Patent Application No. 2020-182524.

* cited by examiner

META LENS AND OPTICAL APPARATUS INCLUDING THE SAME

CROSS-REFERENCE TO RELATED APPLICATIONS

This application is a continuation of U.S. application Ser. No. 17/039,068, filed Sep. 30, 2020, which claims the benefit of U.S. provisional application No. 62/912,143, filed on Oct. 8, 2019 in the U.S. Intellectual Property Office and priority to Korean Patent Application No. 10-2020-0078818, filed on Jun. 26, 2020, in the Korean Intellectual Property Office, the disclosures of which are incorporated herein in their entireties by reference.

BACKGROUND

1. Field

Example embodiments of the present disclosure relate to a meta lens and an optical apparatus including the same.

2. Description of Related Art

An imaging apparatus includes a plurality of lenses for correcting geometric and chromatic aberrations. Usually, a lens having a negative refractive power is used to correct a chromatic aberration, however, a geometric aberration is generated by the lens. An aspherical lens may be used to correct the geometric aberration, but a refractive power of the aspherical lens affects the chromatic aberration.

Therefore, a large number of lenses are needed to simultaneously correct various aberrations. A thickness of a refractive lens of which refractive power is adjusted by using a curvature rapidly increases as the curvature decreases, and thus, it is difficult to implement a thin optical system which corrects various aberrations.

Accordingly, a method of controlling various aberrations by using a metasurface-based lens that is smooth and thin has been investigated.

SUMMARY

One or more example embodiments provide a meta lens capable of implementing a desired refractive power and chromatic aberration with respect to light in a multi-wavelength band.

Additional aspects will be set forth in part in the description which follows and, in part, will be apparent from the description, or may be learned by practice of example embodiments.

According to an aspect of an example embodiment, there is provided a meta lens including a first lens surface, and a second lens surface opposite to the first lens surface, wherein at least one of the first lens surface and the second lens surface is a metasurface including a plurality of nanostructures, the plurality of nanostructures having a sub-wavelength dimension that is less than a central wavelength $\lambda_0$ in an operation wavelength band of the meta lens, and wherein a deflection property of the first lens surface and a deflection property of the second lens surface based on positions of incident light are opposite to each other in at least some regions of each of the first lens surface and the second lens surface.

The at least some regions may include regions from centers of the first lens surface and the second lens surface to half of each of effective diameters of the first lens surface and the second lens surface.

The first lens surface may be configured to deflect incident light in a direction toward an optical axis, a magnitude of a deflection angle gradually increasing from a center to a periphery of the first lens surface in a radial direction, and wherein the second lens surface may be configured to deflect incident light in a direction away from the optical axis, a magnitude of a deflection angle gradually increasing from a center to a periphery of the second lens surface in a radial direction thereof.

At two opposite positions of the first lens surface and the second lens surface, a deflection direction of incident light on the first lens surface and a deflection direction of incident light on the second lens surface may be opposite to each other with respect to a direction of an optical axis of the meta lens.

At two opposite positions of the first lens surface and the second lens surface, a difference between a deflection angle of incident light of the first lens surface and a deflection angle of the second lens surface may be in a range from −30° to 30°.

The first lens surface and the second lens surface may be set such that the meta lens does not have a refractive power with respect to light in a green wavelength band, has a positive refractive power with respect to light in a red wavelength band, and has a negative refractive power with respect to light in a blue wavelength band.

With respect to the central wavelength $\lambda_0$ of an operation wavelength band of the meta lens, a distance between the first lens surface and the second lens surface may be greater than $100\lambda_0$ and less than $1{,}000\lambda_0$.

The first lens surface may be a first metasurface including a plurality of first nanostructures provided in a first shape distribution, and the second lens surface may be a second metasurface including a plurality of second nanostructures provided in a second shape distribution that is different from the first shape distribution.

The first metasurface may have a positive refractive power and the second metasurface may have a negative refraction power.

The meta lens may have an integral structure including one substrate.

The first lens surface may be the metasurface including the plurality of nanostructures, and the second lens surface may be a refractive-type lens surface of a refractive lens having a curved surface.

The refractive-type lens surface may have a concave shape, and a shape distribution of the plurality of nanostructures may be configured such that the metasurface has a positive refractive power.

The plurality of nanostructures may be provided on a surface of the refractive lens opposite to the curved surface.

The plurality of nanostructures may include a column-shape structure including a material having a refractive index different from a refractive index of a neighboring material, or a hole structure engraved inside of a medium layer with a preset refractive index in a column structure.

The plurality of nanostructures are provided in two layers, and nanostructures among the plurality of nanostructures provided in different layers among the two layers may include materials of different refractive indices.

With respect to the central wavelength $\lambda_0$ in an operation wavelength band of the meta lens, a height of the plurality of nanostructures may be greater than $\lambda_0$ and less than $10\lambda_0$.

According to another aspect of an example embodiment, there is provided an imaging lens including at least one refractive lens, and a meta lens including a first lens surface, and a second lens surface opposite to the first lens surface, wherein at least one of the first lens surface and the second lens surface is a metasurface including a plurality of nanostructures, the plurality of nanostructures having a sub-wavelength dimension that is less than a central wavelength $\lambda_0$ in an operation wavelength band of the meta lens, and wherein a deflection property of the first lens surface and a deflection property of the second lens surface based on positions of incident light are opposite to each other in at least some regions of each of the first lens surface and the second lens surface.

An imaging device may include the imaging lens, and an image sensor configured to convert an optical image formed by the imaging lens into an electric signal.

According to yet another aspect of an example embodiment, there is provided an imaging lens including a plurality of lens elements, the imaging lens including a plurality of refractive lenses, a first meta lens provided in a pre-medium position of a light path along an arrangement order of the plurality of lens elements, the first meta lens including a first metasurface including a plurality of nanostructures, a second meta lens, provided at a post-medium position of the light path along the arrangement order of the plurality of lens elements, wherein the second meta lens is a meta lens, the second meta lens including a first lens surface, and a second lens surface opposite to the first lens surface, wherein at least one of the first lens surface and the second lens surface is a metasurface including a plurality of nanostructures, the plurality of nanostructures having a sub-wavelength dimension, and wherein a deflection property of the first lens surface and a deflection property of the second lens surface based on positions of incident light are opposite to each other in at least some regions of each of the first lens surface and the second lens surface.

The first meta lens may be configured to correct longitudinal chromatic aberrations of the imaging lens, and the second meta lens may be configured to correct lateral chromatic aberrations of the imaging lens.

A shape distribution of nanostructures of the first metasurface may be configured such that the first meta lens operates as a convex lens in a range from a center to half of an effective diameter of the first meta lens.

A range of an angle at which the first meta lens deflects incident light may be from −5° to +5°.

The second meta lens may have an integral structure including a substrate with a first surface and a second surface that is opposite to the first surface.

The second meta lens may include a second metasurface including a plurality of nanostructures provided in a second shape distribution on the first surface, and a third metasurface including a plurality of nanostructures provided in a third shape distribution that is different from the second shape distribution on the second surface.

With respect to the central wavelength $\lambda_0$ of an operation wavelength band of the second meta lens, a distance between the second metasurface and the third metasurface may be greater than $100\lambda_0$ and less than $1{,}000\lambda_0$.

The at least some regions of the second meta lens may include regions from centers of the second metasurface and the third metasurface to half of each of effective diameters of the second metasurface and the third metasurface.

The second metasurface may be configured to deflect incident light in a direction toward an optical axis, a magnitude of a deflection angle gradually increasing from a center to a periphery of the second metasurface in a radial direction of the second metasurface, and the third metasurface may be configured to deflect incident light in a direction away from the optical axis, a magnitude of a deflection angle gradually increasing from a center to a periphery of the third metasurface in a radial direction of the third metasurface.

At two opposite positions of the second metasurface and the third metasurface, a deflection direction of incident light on the second metasurface and a deflection direction of incident light on the third metasurface may be opposite to each other with respect to a direction of an optical axis of the imaging lens.

At two opposite positions of the second metasurface and the third metasurface, a difference between a deflection direction of incident light on the second metasurface and a deflection direction of incident light on the third metasurface may be in a range from −30° to +30°.

The second metasurface and the third metasurface may be set such that the second meta lens does not have a refractive power with respect to light in a green wavelength band, has a positive refractive power with respect to light in a red wavelength band, and has a negative refractive power with respect to light in a blue wavelength band.

An imaging device may include the imaging lens of claim, and an image sensor configured to convert an optical image formed by the imaging lens into an electric signal.

According to yet another aspect of an example embodiment, there is provided a meta lens including a first metasurface including a plurality of first nanostructures, the first metasurface configured to deflect incident light at a plurality of first deflection angles, and a second metasurface opposite to the first metasurface, the second metasurface including a plurality of second nanostructures, the second metasurface configured to deflect incident light at a plurality of second deflection angles, wherein the plurality of first nanostructures and the plurality of second nanostructures have a sub-wavelength dimension that is less than a central wavelength $\lambda_0$ in an operation wavelength band of the meta lens, and wherein a first deflection angle of the plurality of first deflection angles is opposite to a second deflection angle of the plurality of second deflection angles in a region of the first metasurface and a corresponding region of the second metasurface.

BRIEF DESCRIPTION OF THE DRAWINGS

The above and/or other aspects, features, and advantages of certain example embodiments will be more apparent from the following description taken in conjunction with the accompanying drawings, in which.

DETAILED DESCRIPTION

Figure 1:
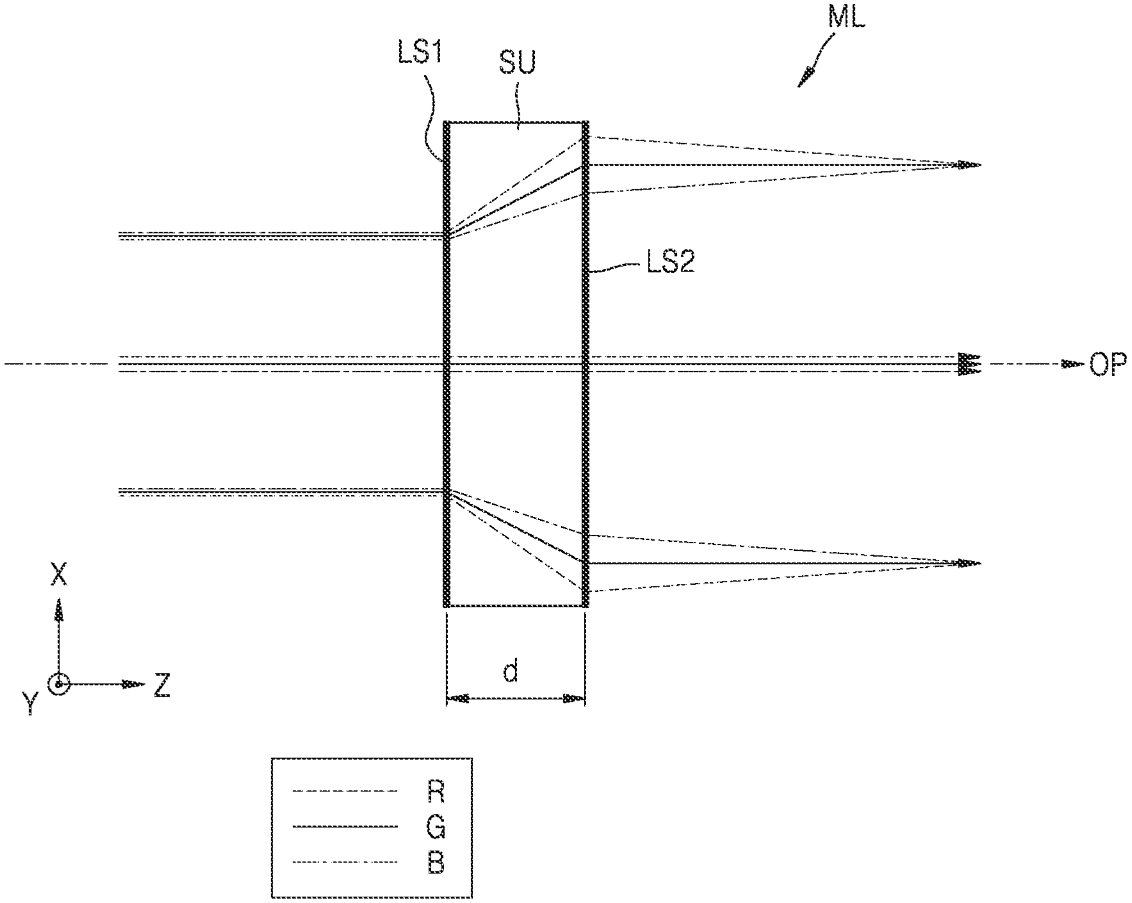
FIG. 1 is a conceptual diagram for briefly describing a structure and a function of a meta lens according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described in detail with reference to the accompanying drawings. The example embodiments described herein are merely illustrative, and various modifications may be made from the embodiments. In the following drawings, same reference numerals denote same elements, and in the drawings, sizes of the elements may be exaggerated for clarity and convenience of explanation.

Hereinafter, the terms "above" or "on" may include a component directly on another component in a contact manner, without excluding a component above another component in a non-contact manner.

Although the terms first, second, etc. may be used to describe various elements, these terms are only used to distinguish one element from another. These terms are not used to limit materials or structures of the elements.

Singular forms are intended to include plural forms as well, unless the context clearly indicates otherwise. It will be further understood that when a part "includes" or "comprises" an element, unless otherwise defined, the part may further include other elements, not excluding the other elements.

The terms such as "unit" or "module" used herein are understood as a unit that processes at least one function or operation and that may be embodied in a hardware manner, a software manner, or a combination of the hardware manner and the software manner.

Usage of the term "the" and similar indications terms thereof may correspond to both singular and plural forms.

Without explicit descriptions that processes included in a method are to be performed in the described order, the processes may be performed in appropriate orders. In addition, all illustrative terms (for example, and the like) are merely used to describe the technical idea in detail, and unless defined by the claims, the scope of claim is not limited to those terms.

FIG. 1 is a conceptual diagram illustrating a structure and a function of a meta lens according to an example embodiment.

A meta lens ML includes a first lens surface LS1 and a second lens surface LS2 that is arranged apart from the first lens surface LS1 at a preset distance d in an optical axis OP direction. As shown in FIG. 1, the first lens surface LS1 and the second lens surface LS2 may share one substrate SU and may be formed at two opposing surfaces of the substrate SU. However, the first lens surface LS1 and the second lens surface LS2 are not limited thereto, and may be respectively supported by separate supporting substrates.

With reference to a central wavelength $\lambda_0$ of an operation wavelength band of the meta lens ML, the distance d between the first lens surface LS1 and the second lens surface LS2 may be greater than $\lambda_0$. The distance d may be, for example, greater $100\lambda_0$ than and less than $1{,}000\lambda_0$. For example, a thickness of the substrate SU may be set to be greater $100\lambda_0$ than and less than $1{,}000\lambda_0$.

The meta lens ML may have a preset chromatic aberration with respect to incident light, thereby correcting chromatic aberrations generated by other optical members. Detailed structures of the first lens surface LS1 and the second lens surface LS2 are set such that the meta lens ML corrects the chromatic aberration while reducing the amount of geometric aberration generated as much as possible. At least one of the first lens surface LS1 and the second lens surface LS2 may be a metasurface. For example, both the first lens surface LS1 and the second lens surface LS2 may be metasurfaces, or one of the first lens surface LS1 and the second lens surface LS2 may be a metasurface and another one may be a refractive-type lens surface.

A metasurface may be a structure including a plurality of nanostructures having a shape dimension of a sub-wavelength, in which a shape, an arrangement, etc. of the plurality of nanostructures are set to implement a preset transmission phase distribution by modulating a phase of incident light according to incident positions. The metasurface may have a positive refractive power or a negative refractive power, implement various focal lengths, and may have a chromatic aberration, in which the focal lengths are dependent on wavelengths.

A refractive-type lens surface may be a lens surface of a general refractive lens, for example, a surface having a refractive power with respect to incident light by a refractive index and a curved surface shape. The shape of the refractive-type lens surface may be concave or convex, or the refractive-type lens surface may have a curved surface having an inflection point, of which shape is changed to concave or convex, depending on a position of the lens surface. The refractive-type lens surface may be spherical or aspherical. The refractive-type lens surface also has a chromatic aberration, because a refractive index of the refractive lens is generally dependent on a wavelength.

A detailed structure of the metastructure included in the meta lens ML and a detailed structure of the refractive-type lens surface used together with the metasurface may be set such that the meta lens ML implements a desired chromatic aberration by a combination of the metasurface and the refractive-type lens surface, and such that generation of geometric aberrations is reduced as much as possible.

The first lens surface LS1 and the second lens surface LS2 may have different properties to deflect incident light according to positions in a different manners. Deflection of light may be a change in a light passage due to diffraction or refraction. The first lens surface LS1 may deflect the incident light in a direction toward the optical axis, and a magnitude of a deflection angle may gradually increase from a center to a periphery of the first lens surface LS1 in a radial direction. The second lens surface LS2 may deflect the incident light in a direction away from the optical axis, and a magnitude of a deflection angle may gradually increase from a center to a periphery of the second lens surface LS2 in a radial direction. The different properties of deflection may be shown in at least a portion of regions of the first lens surface LS1 and the second lens surface LS2. For example, in at least a portion of regions of the first lens surface LS1 and the second lens surface LS2, properties to deflect incident light depending on positions may be opposite to each other. The portion of regions may include a paraxial region, for example, a region from a center of each of the first lens surface LS1 and the second lens surface LS2 to half an effective diameter of each of the first lens surface LS1 and the second lens surface LS2. Details thereof will be described again with reference to FIGS. 5 and 6.

Refractive powers of the first lens surface LS1 and the second lens surface LS2 at the paraxial region may be opposite to each other. The refractive powers of the entire first lens surface LS1 and the entire second lens surface LS2 may be opposite to each other. For example, the first lens surface LS1 may have a positive refractive power in general, and the second lens surface LS2 may have a negative refractive power in general. However, embodiments are not limited thereto.

Due to operation of the first lens surface LS1 and the second lens surface LS2, the entire meta lens ML may not substantially have a refractive power with respect to the incident light. For example, as shown in FIG. 1, the meta lens MS does not have a refractive power with respect to light G of the green wavelength band, which is a central wavelength band, and may have a positive refractive power with respect to light R of the red wavelength band and have a negative refractive power with respect to light B of the blue wavelength band.

The first lens surface LS1 and the second lens surface LS2 included in the meta lens ML are configured such that the deflection angle distribution is canceled out by a significant amount, and accordingly, may exhibit a desirable chromatic aberration with little impact on a geometric aberration.

Figure 2A:
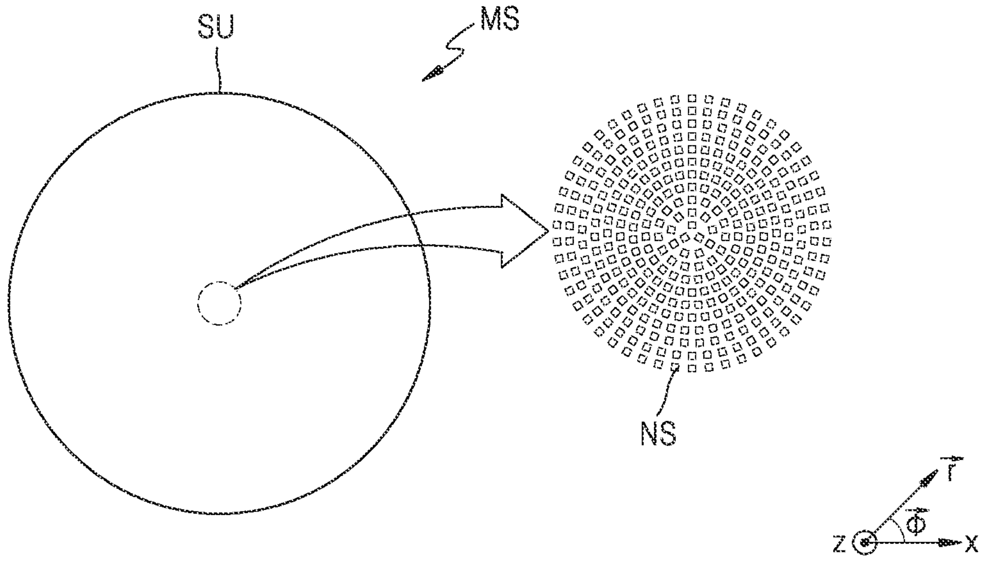
FIG. 2A is a top-plan view illustrating an example configuration of a metasurface that may be included in the meta lens of FIG. 1.
Figure 2B:
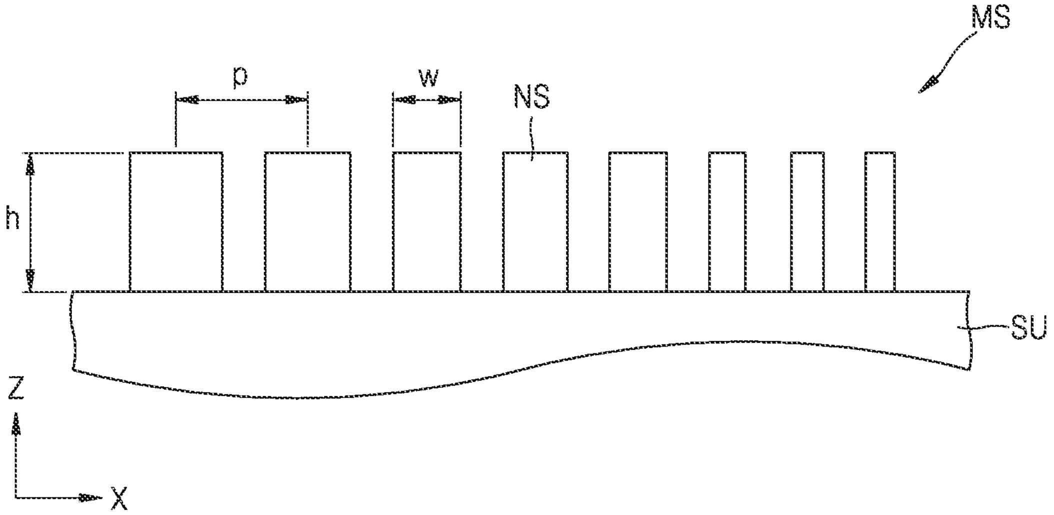
FIG. 2B is a cross-sectional view of a partial area of FIG. 2A.

FIG. 2A is a top-plan view illustrating an example configuration of a metasurface that may be provided in the meta lens of FIG. 1, and FIG. 2B is a cross-sectional view of a partial area of FIG. 2A.

A metasurface MS includes a plurality of nanostructures NS having a shape dimension of a sub-wavelength. The plurality of nanostructures NS may be arranged on the substrate SU having a refractive index different from that of the nanostructures NS. The sub-wavelength indicates a dimension that is smaller than the central wavelength of the operation wavelength band of the meta lens MS. The operation wavelength band may be, but is not limited to, a visible ray band of a range from about 400 nm t about 700 nm.

The plurality of nanostructures NS may be arranged in a plurality of ring shapes. Shapes and sizes of the nanostructures NS according to positions may be determined based on a function of a distance r from the center of the metasurface MS, and may have a polar symmetrical distribution. However, this is merely an example and the embodiments are not limited thereto.

Arrangement pitches p of the nanostructures NS, that is, distances between centers of adjacent nanostructures NS, widths w and heights h of the nanostructures NS may be different from one another in the plurality of nanostructures NS. Shapes, sizes, and arrangement cycles of the nanostructures NS according to positions may be determined according to a phase delay function to be implemented by the metasurface MS. A transmission phase distribution of light transmitted through the metasurface MS is determined according to the phase delay function, and the meta lens ML exhibits a preset optical function according to the transmission phase distribution. For example, the shapes, the sizes, and arrangement cycles of the nanostructures NS according to positions may be set according to an optical function to be exhibited by the metasurface MS.

Figure 3:
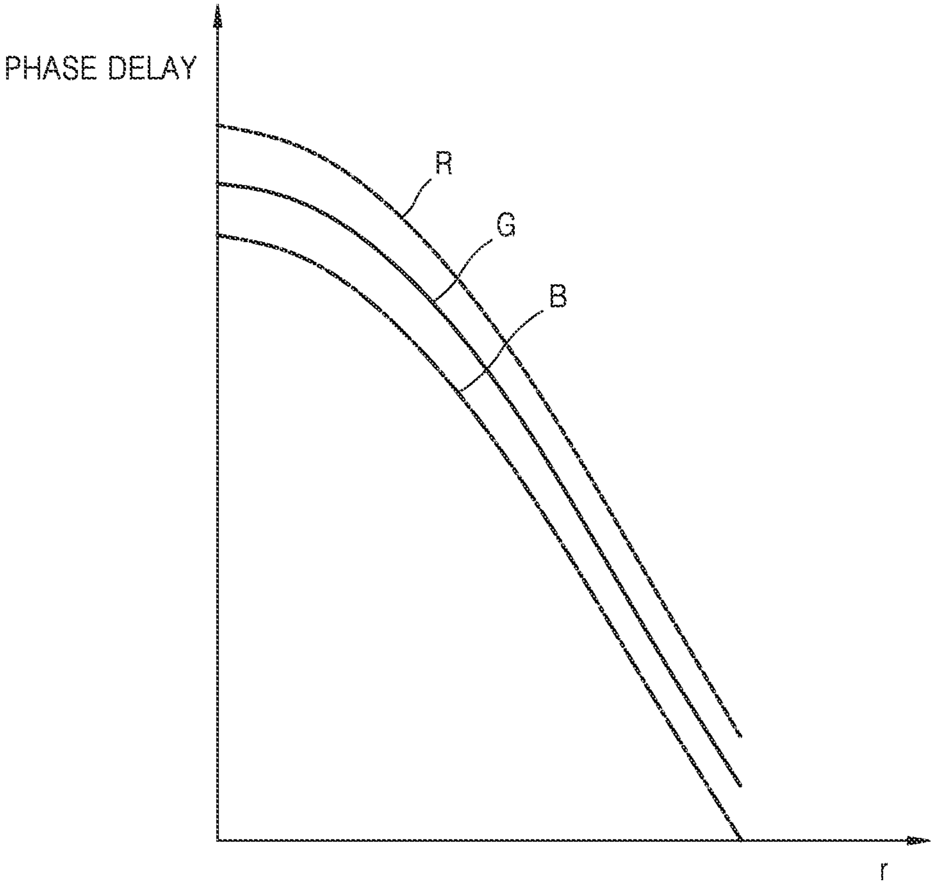
FIG. 3 is a graph conceptually showing a phase change tendency according to positions due to a metasurface according to an example embodiment.

FIG. 3 is a graph conceptually illustrating a phase change property according to positions due to a metasurface according to an example embodiment.

Referring to the graph, lights in different wavelength bands, for example, the phase change properties of red light R, green light G, and blue light B with respect to the distance r from the center of the metasurface MS are similar. From among the light incident to the metasurface having the phase change properties, the red light R, the green light G, and the blue light B exhibit different transmission phase distributions and are deflected at different angles. When two of this type of metasurfaces are arranged adjacent to each other, a difference in the transmission phase distribution due to one metasurface causes change in positions of the red light R, the green light G, and the blue light B incident on the next metasurface, and differences in the positions increase as a distance between the two metasurfaces increases.

The meta lens ML according to example embodiments include a metasurface having the above-described phase change property, and corrects a chromatic aberration. For example, the meta lens ML implements a desired chromatic aberration with little impact on the geometric aberration, by using two metasurfaces or by using one metasurface and a refractive-type lens surface, which are configured to cancel out the deflection angle distribution by a significant amount.

Figure 4A:
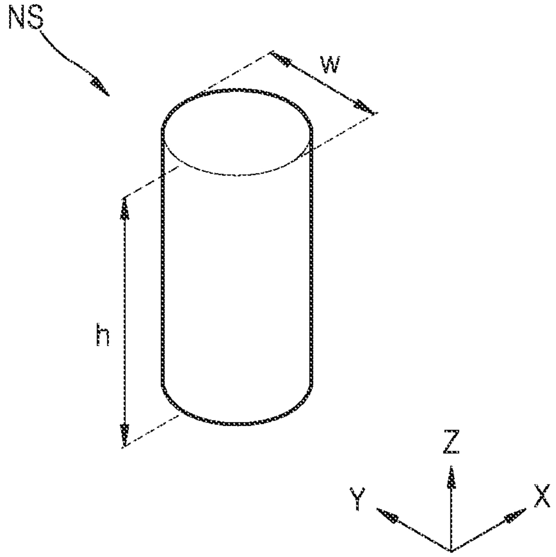
FIGS. 4A, 4B, and 4C illustrate example shapes of a nanostructure included in a metasurface according to an example embodiment.
Figure 4B:
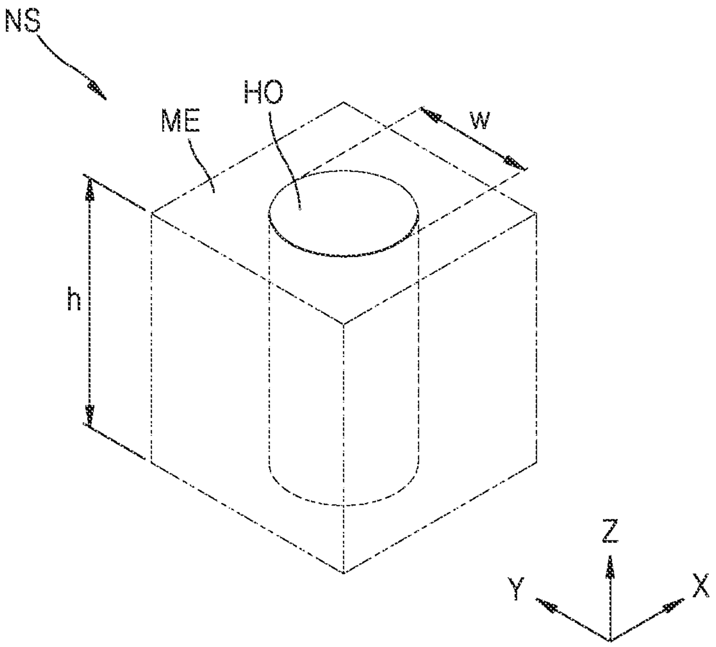
Figure 4C:
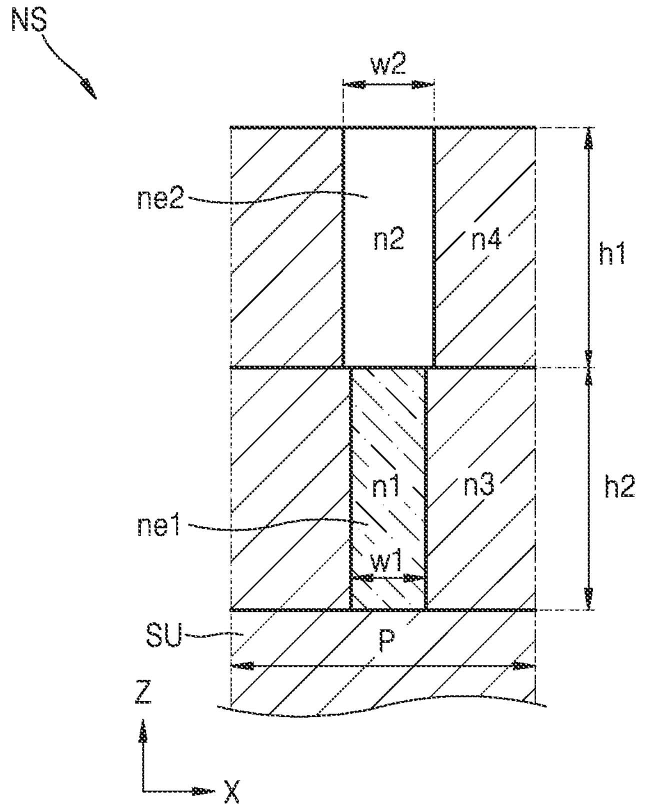

FIGS. 4A, 4B, and 4C illustrate example shapes of the nanostructure provided on the metasurface according to an example embodiment.

Referring to FIG. 4A, the nanostructure NS may have a column shape having a height of h and a diameter of w. The shape of the nanostructure NS is not limited thereto, and, for example, the nanostructure NS may have a pillar shape having a cross-section of various types with definable height and width. The cross-section may have a polygon shape, an oval shape, and or other various shapes.

The width w of the nanostructure NS may be smaller than the central wavelength $\lambda_0$ of the operation wavelength band of the meta lens ML, and the height h of the nanostructure may be greater $\lambda_0$. The height h of the nanostructure NS may be greater than $\lambda_0$ and smaller than $10\lambda_0$.

The nanostructure NS may include a material having a refractive index different from that of a neighboring material. A difference in refractive indices between the nanostructure NS and the neighboring material may be equal to or greater than 0.5. For example, the nanostructure NS may include a material that has a refractive index higher than a refractive index of the neighboring material. The neighboring material may be, for example, air, the substrate SU (see FIG. 2B) that supports the nanostructure NS, or may be a protection layer for covering and protecting the nanostructure NS.

The nanostructure NS may include a material including at least one of c-Si, p-Si, a-Si and a Group III-V compound semiconductor (gallium phosphide (GaP), gallium nitride (GaN), gallium arsenide (GaAs), and the like), silicon carbide (SiC), titanium dioxide ($TiO_2$), and silicon nitride (SiN).

Referring to FIG. 4B, the nanostructure NS may include the form of a hole HO such that inside of a medium layer ME, which has a preset refractive index, is engraved in a column shape. An inside of the hole HO may be empty and may be filled with air, or an inside of the hole HO may be filled with a material having a refractive index lower than that of the medium layer ME. The medium layer ME may include a material including at least one of c-Si, p-Si, a-Si, and a Group 3-5 compound semiconductor (GaP, GaN, GaAs, and the like), SiC, $TiO_2$, and SiN, and the inside of the hole HO may be filled with air or a polymer material such as SU-8, polymethyl methacrylate (PMMA), and the like.

Referring to FIG. 4C, the nanostructure NS may have a stack structure. For example, a shape as shown in FIG. 4A and/or a structure as shown in FIG. 4B may be stacked in a plurality of layers on the substrate SU. As shown in FIG. 4C, a first layer is formed by surrounding a first nanoelement ne1 having a preset shape of a width w1, a height h1 and including a material of a refractive index n1 with a material having a refractive index n3, and a second layer is formed by stacking, on the first layer, a second nanoelement ne2 having a preset shape of a width w2, a height h2 and including a material of a refractive index n2 and a material of a refractive index surrounding the nanoelement ne2. The nanoelement ne1 or the nanoelement ne2 may be an empty space including air.

The width w1 of the first nanoelement ne1 and a width w2 of the second nanoelement ne2 may be a sub-wavelength, that is, smaller than the central wavelength $\lambda_0$ of the operation wavelength band of the meta lens ML, and the height h1 of the first nanoelement ne1 and the height h2 of the second nanoelement ne2 may be greater than $2\lambda_0$.

In the first layer, the refractive index n1 of the first nanoelement ne1 and the refractive index n3 of the neighboring material may be different from each other. For example, n1>n3 or n1<n3. A difference between n1 and n3 may be equal to or greater than 0.5. In the second layer, the refractive index n2 of the second nanoelement ne2 and the refractive index n4 of the neighboring material n4 may be different from each other. For example, n2>n4 or n2<n4. A difference between n2 and n4 may be equal to or greater than 0.5. The refractive index n1 of the first nanoelement ne1 and the refractive index n2 of the second nanoelement ne2 may be different from each other. For example, n1>n2 or n2<n1. A difference between n1 and n2 may be equal to or greater than 0.5. Refractive indices of the neighboring material, n3 and n4 may be different from each other or identical to each other.

A period p as illustrated in FIG. 4C corresponds to a period by which the nanostructure NS repeatedly arranged. The nanostructure NS as shown in FIG. 4C may be constructed by various combinations of w1, w2, h1, h2, p, n1, n2, n3, and n4 according to the above-described conditions, and thus, it may be easier to implement a metasurface having a desired transmission phase distribution by using the nanostructure NS.

Figure 5:
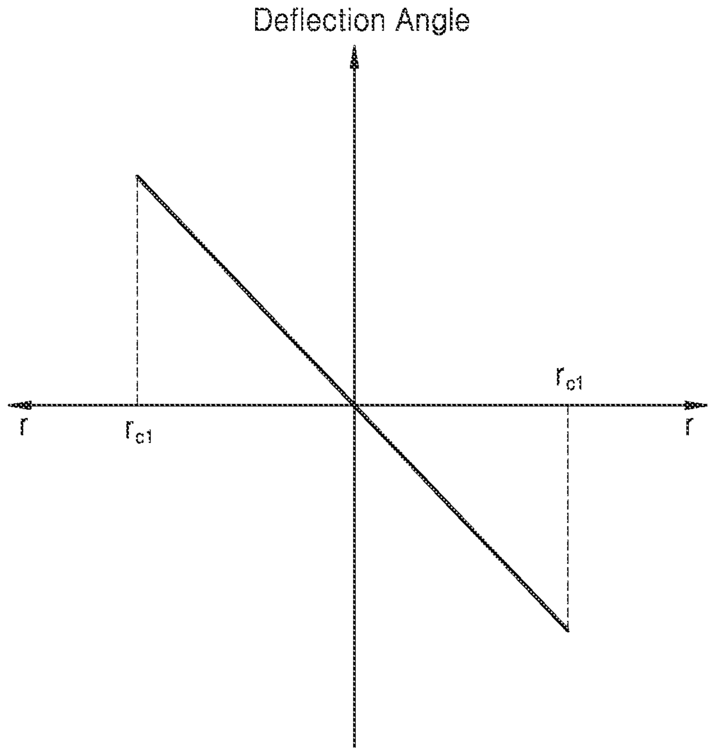
FIG. 5 is a graph showing an example of a distribution of angles at which a first lens surface provided in the meta lens of FIG. 1 deflects incident light.
Figure 6:
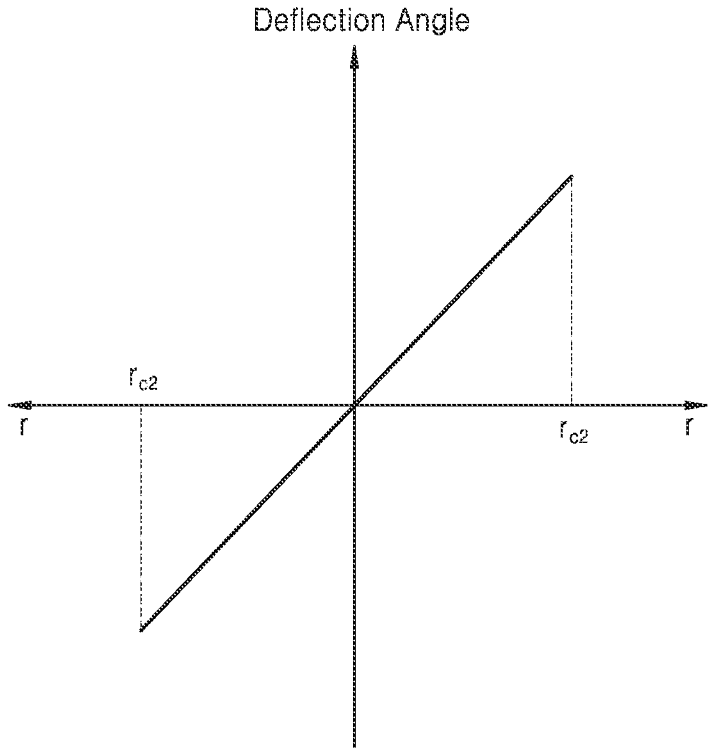
FIG. 6 is a graph showing an example of a distribution of angles at which a second lens surface provided in the meta lens of FIG. 1 deflects incident light.
Figure 7:
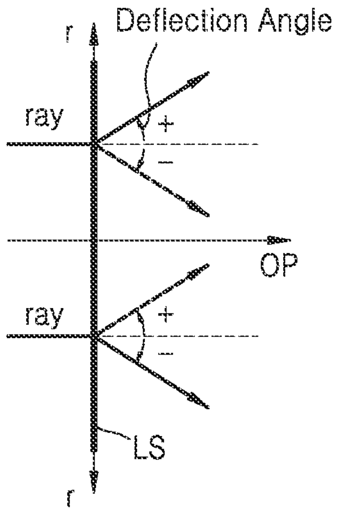
FIG. 7 is a conceptual diagram for describing a criterion of deflection angles shown in the graphs of FIGS. 5 and 6.

FIGS. 5 and 6 are graphs each showing an example of a distribution of angles at which the first lens surface LS1 and the second lens surface LS2 provided in the meta lens ML of FIG. 1 each deflects incident light, and FIG. 7 is a conceptual diagram for describing a criterion of deflection angles shown in the graphs of FIGS. 5 and 6.

As described above, the first lens surface LS1 and the second lens surface LS2 may have different properties to deflect incident light according to incident positions. This is to minimize generation of the geometric aberration by having deflection angle distributions respectively generated from the first lens surface LS1 and the second lens surface LS2 cancel out each other.

As shown in FIG. 7, a deflection angle indicates an angle between a direction, in which ray deflects from the lens surface LS, and an incident direction. When a deflection direction is counterclockwise with respect to the optical axis OP, the deflection angle is shown as positive (+), and when the deflection direction is clockwise with respect to the optical axis OP, the deflection direction is shown as negative (−). With reference to the optical axis OP, a positive deflection angle of light incident to a region of the lens surface LS above the optical axis OP indicates deflection in a direction away from the optical axis OP, and a negative deflection angle indicates deflection in a direction toward the optical axis OP. On the contrary, with reference to the optical axis OP, a positive deflection angle of light incident to a region of the lens surface LS below the optical axis OP indicates deflection in a direction toward the optical axis OP, and a negative deflection angle indicates deflection in a direction away from the optical axis OP.

In the graph of FIG. 5, the horizontal axis is a radius direction of the first lens surface LS1, the right is a region above the optical axis OP in the region of the first lens surface LS1, and the left is a region below the optical axis OP in the region of the first lens surface LS1.

Referring to the graph of FIG. 5, the deflection angle in the region above the optical axis OP is negative (−), which indicates deflection in a direction toward the optical axis OP. The magnitude of the angle increases away from the center. In the region below the optical axis OP, the deflection angle is positive (+), which indicates deflection in a direction toward the optical axis OP. The magnitude of the angle increases away from the center. This type of deflection property corresponds to a positive refractive power. The deflection property may not appear in all regions of the first lens surface LS1 and may appear in a preset region including a paraxial region, for example, a region from the center of the lens to a preset radius $r_{c1}$. For example, when an effective diameter of the first lens surface LS1 is $2r_{e1}$, the preset radius $r_{c1}$ may be greater than $r_{e1}/2$.

In the graph of FIG. 6, the horizontal axis is a radius direction of the second lens surface LS2, the right is a region above the optical axis OP in the region of the second lens surface LS2, and the left is a region below the optical axis OP in the region of the second lens surface LS2.

Referring to the graph of FIG. 6, the deflection angle in the region above the optical axis OP is positive (+), which indicates deflection in a direction toward the optical axis OP. The magnitude of the angle increases away from the center. In the region below the optical axis OP, the deflection angle is negative (−), which indicates deflection in a direction away from the optical axis OP. The magnitude of the angle increases away from the center. This type of deflection property corresponds to a negative refractive power. The deflection property may not appear in all regions of the second lens surface LS2 and may appear in a preset region including the paraxial region, that is, a region from the center of the lens to a preset radius $r_{c2}$. For example, when an effective diameter of the second lens surface LS2 is $2r_{e2}$, the preset radius $r_{c2}$ may be greater than $r_{e2}/2$.

The graphs of FIGS. 5 and 6 indicate the directions of deflecting the incident light are opposite to each other according to incident positions in at least some regions of the first lens surface LS1 and the second lens surface LS2. However, the graphs of FIGS. 5 and 6 are limited to being symmetrical to each other. For example, absolute values of gradients of the graphs of FIGS. 5 and 6 may be different from each other. In addition, effective diameters of the first lens surface LS1 and the second lens surface LS2 may be different from each other, and even when the effective diameters of the first lens surface LS1 and the second lens surface LS2 are equal to each other, $r_{c1}$ and $r_{c2}$ may be different from each other. In two opposite positions of the first lens surface LS1 and the second lens surface LS2, angles at which the incident light is deflected may be different from each other, and a difference between the angles may be in a range from about −30° to about 30°.

Although the graphs of FIGS. 5 and 6 are described as respectively related to the first lens surface LS1 and the second lens surface LS2, the description is merely illustrative and may be changed with each other.

Unlike a common refractive lens having a geometric aberration that increases when a chromatic aberration is reduced, in the above-described meta lens ML, decrease in a chromatic aberration does not result in an increase in a geometric aberration. For example, desired chromatic aberration and geometric aberration may be implemented by applying a metasurface to at least one of the first lens surface LS1 and the second lens surface LS2, and canceling out a considerable amount of deflection angle distributions of the first lens surface LS1 and the second lens surface LS2.

Hereinafter, a configuration of a meta lens according to various example embodiments, which operates similar to those of the above-described meta lens ML, will be described.

Figure 8:
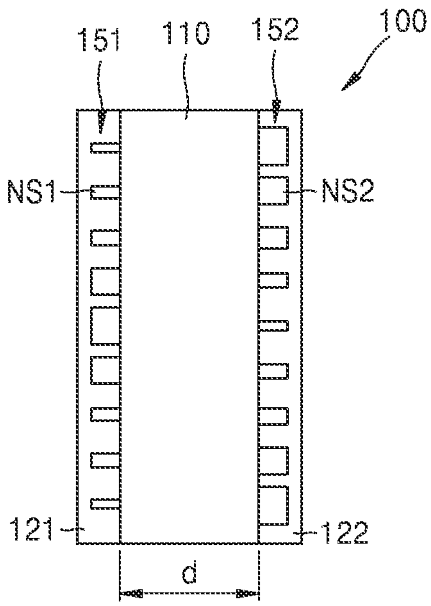
FIG. 8 is a cross-sectional view of a meta lens according to an example embodiment.

FIG. 8 is a cross-sectional view of a meta lens according to an example embodiment.

A meta lens 100 according to an example embodiment corresponds to an example in which the first lens surface LS1 and the second lens surface LS2 shown in FIG. 1 both include metasurfaces. The meta lens 100 includes a first metasurface 151 and a second metasurface 152 apart from each other by a preset distance d. As shown in FIG. 8, the meta lens 100 may have an integral structure based on one substrate 110. For example, the first metasurface 151 and the second metasurface 152 may be formed on two opposite surfaces of the substrate 110. However, this is merely an example, and the first metasurface 151 and the second metasurface 152 may be provided in separated supporting substrates.

The first metasurface 151 includes a plurality of first nanostructures NS1 arranged in a first shape distribution on a first surface 110*a* of the substrate 110. In addition, a protection layer 121 covering the plurality of first nanostructures NS1 may be provided. The protection layer 121 may be omitted.

The second metasurface 152 includes a plurality of second nanostructures NS2 arranged in a second shape distribution, which is different from the first shape distribution, on a second surface 110*b* of the substrate 110. In addition, a protection layer 122 covering the plurality of second nanostructures NS2 may be provided. The protection layer 122 may be omitted.

With reference to a central wavelength $\lambda_0$ in an operation wavelength band of the meta lens 100, a distance d between the first metasurface 151 and the second metasurface 152 may be greater than $\lambda_0$. The distance d may be, for example, greater than $100\lambda_0$ and smaller than $1000\lambda_0$. The distance d between the first metasurface 151 and the second metasurface 152 may be set according to requirements of a chromatic aberration and a geometric aberration to be exhibited by the meta lens 100, and a thickness of the substrate 110 may be set according to the requirements.

The substrate 110, which supports the first nanostructures NS1 and the second nanostructures NS2, may include a material having a refractive index different from the refractive indices of the first nanostructures NS1 and the second nanostructures NS2. A difference between the refractive index of the substrate 110 and the refractive indices of the first nanostructures NS1 and the second nanostructures NS2 may be equal to or greater than 0.5. Refractive indices of the first nanostructures NS1 and the second nanostructures NS2 may be greater than the refractive index of the substrate 110, but is not limited thereto. For example, the refractive index of the substrate 110 may be greater than the refractive indices of the first nanostructures NS1 and the second nanostructures NS2.

The substrate 110 may include any one of glass (fused silica, BK7, and the like), quartz, and polymer (PMMA, SU-8, and the like), or may include a semiconductor substrate. The first nanostructures NS1 and the second nanostructures NS2 may include at least one of C-Si, p-Si, a-Si, and a Group III-V compound semiconductor (GaP, GaN, GaAs, and the like), SiC, $TiO_2$, and SiN.

The protection layers 121 and 122 may include a polymer material such as SU-8, PMMA, and the like.

The first metasurface 151 may have a positive refractive power, and the second metasurface 152 may have a negative refractive power. However, the embodiments are not limited thereto. For example, the first metasurface 151 may have a negative refractive power, and the second metasurface 152 may have a positive refractive power.

The first metasurface 151 and the second metasurface 152 may have diffraction angle distribution illustrated in FIGS. 5 and 6, respectively. As diffraction angles of the first metasurface 151 and the second metasurface 152 cancel each other out by a considerable amount, a light path that has transmitted through both the first metasurface 151 and the second metasurface 152 after being incident to the meta lens 100 may have a very small difference from a light path before incidence, and a geometric aberration generated by the first metasurface 151 and the second metasurface 152 may be very small.

With respect to light transmitted through a region having a diffraction angle as shown in FIG. 5, the first metasurface 151 has a chromatic aberration that makes a focal length of light of a long wavelength smaller than that of light of a short wavelength. With respect to light transmitted through a region having a diffraction angle as shown in FIG. 6, the second metasurface 152 has a chromatic aberration that makes a focal length of light of a long wavelength greater than that of light of a short wavelength. Therefore, a desired chromatic aberration may be implemented by adjusting a difference between diffraction angles generated due to the first metasurface 151 and the second metasurface 152.

Although both the first surface 110*a* and the second surface 110*b* are shown as flat surfaces, embodiments are not limited thereto. For example, one of the first surface 110*a* and the second surface 110*b* may be a convex curved surface. Although top surfaces of the protection layers 121 and 122 are shown as flat surfaces, embodiments are not limited thereto. For example, one of the top surfaces of the protection layers 121 and 122 may be a curved surface. A focal length, a chromatic aberration, and a chromatic aberration to be implemented by the meta lens 100 may be finely adjusted by a curved surface added in this way.

Figure 9:
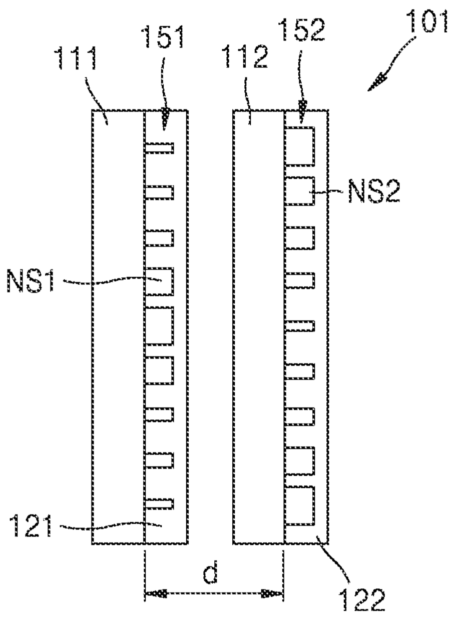
FIG. 9 is a cross-sectional view of a meta lens according to another example embodiment.

FIG. 9 is a cross-sectional view of a meta lens according to another example embodiment.

A meta lens 101 in the example embodiment, which is a modified example of the meta lens 100 of FIG. 8, has a difference only in that the first metasurface 151 and the second metasurface 152 are respectively supported by separate substrates 111 and 112, and other configurations of the meta lens 101 are substantially identical to those of the meta lens 100 of FIG. 8.

Figure 10:
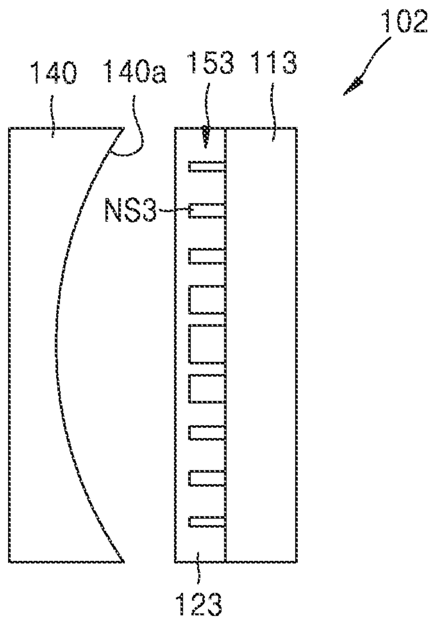
FIG. 10 is a cross-sectional view of a meta lens according to another example embodiment.

FIG. 10 is a cross-sectional view of a meta lens according to another example embodiment.

A meta lens 102 in the example embodiment corresponds to an example in which one of the first lens surface LS1 and the second lens surface LS2 shown in FIG. 1 includes a refractive-type lens surface and another one includes a metasurface.

The meta lens 102 includes a refractive lens 140 and a metasurface 153.

A refractive lens 140 may have a concave refractive-type lens surface 140*a*.

A metasurface 153 includes a plurality of nanostructures NS3 arranged in a preset shape distribution. The nanostructures NS are supported by a substrate 113, and a protection layer 123 that covers and protects the plurality of nanostructures NS may be further provided.

The shape of distribution of the plurality of nanostructures NS3 may be set such that the metasurface 153 has a positive refractive power.

The metasurface 153 and the refractive-type lens surface 140*a* may have deflection angle distributions as the graphs illustrated in FIGS. 5 and 6, respectively. As the deflection angle distributions of the metasurface 153 and the refractive-type lens surface 140*a* cancel each other out by a considerable amount, a chromatic aberration is hardly generated in the meta lens including the metasurface 153 and refractive-type lens surface 140.

Figure 11:
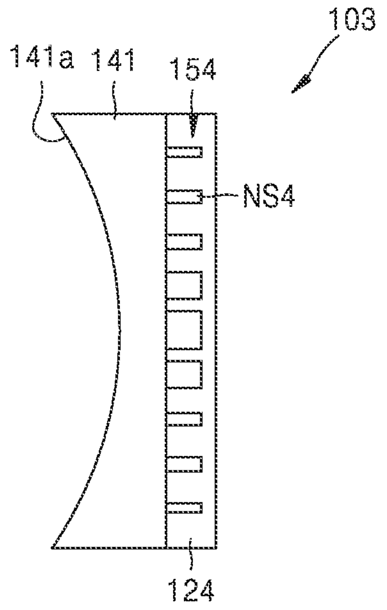
FIG. 11 is a cross-sectional view of a meta lens according to another example embodiment.

FIG. 11 is a cross-sectional view of a meta lens according to another example embodiment.

A meta lens 103 includes a refractive-type lens surface 141*a*, which is concave, and a metasurface 154. The metasurface 154 may have a positive refractive power. The meta lens 103 may have a structure in which the refractive-type lens surface 141*a* and the metasurface 142 are integrated, and as shown in FIG. 11, a plurality of nanostructures NS4 are formed on a surface of a concave lens 141 to construct the metasurface 154. In addition, a protection layer 124 that covers and protects the plurality of nanostructures NS4 may be further provided. The protection layer 124 may be omitted.

In FIGS. 10 and 11, a meta lens including a concave refractive-type lens surface and a metasurface having a positive refractive power is illustrated and described.

A meta lens in another example embodiment may have a convex refractive-type lens surface and a metasurface having a negative refractive power. This example embodiment has a structure for increasing a chromatic aberration in a sense that both the refractive-type lens surface and the metasurface show chromatic aberrations rendering a focal length of light of a long wavelength greater than that of light of a short wavelength. The structure may be used to reduce generation of a geometric aberration as much as possible and generate a desired chromatic aberration.

Figure 12:
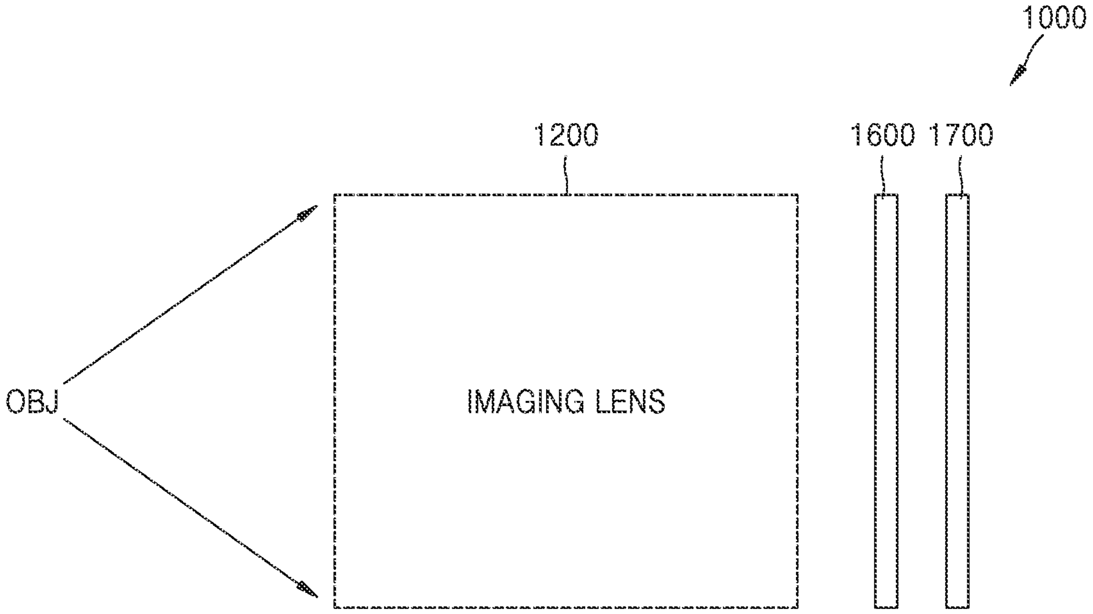
FIG. 12 briefly illustrates a configuration and an optical arrangement of an imaging apparatus according to an example embodiment.

FIG. 12 briefly illustrates a configuration and an optical arrangement of an imaging apparatus according to an example embodiment.

An imaging apparatus 1000 includes an imaging lens 1200, and an image sensor 1700 for converting an optical image of an object OBJ, which is generated by the imaging lens 1200, into an electric signal. An infrared cut-off filter 1600 may be provided between the imaging lens 1200 and the image sensor 1700.

The imaging lens 1200 may include any one of the above-described meta lenses ML 100, 101, 102, and 103 and at least one refractive lens.

The image sensor 1700 is arranged at a position of an image plane on which an optical image of the object OBJ is formed by the imaging lens 1200. The image sensor 1700 may include an array such as a charge-coupled device (CCD), a complementary metal-oxide-semiconductor (CMOS), or photodiode which senses light and generates an electric signal.

A meta lens included in the imaging lens 1200 may be used for adjusting overall chromatic aberrations and geometric aberrations of the imaging lens 1200. For example, the meta lens included in the imaging lens 1200 may correct chromatic aberrations generated by other refractive lenses, and generation of additional geometric aberrations may be reduced as much as possible. Accordingly, the imaging apparatus 1000 may obtain a high quality image of the object OBJ.

Figure 13:
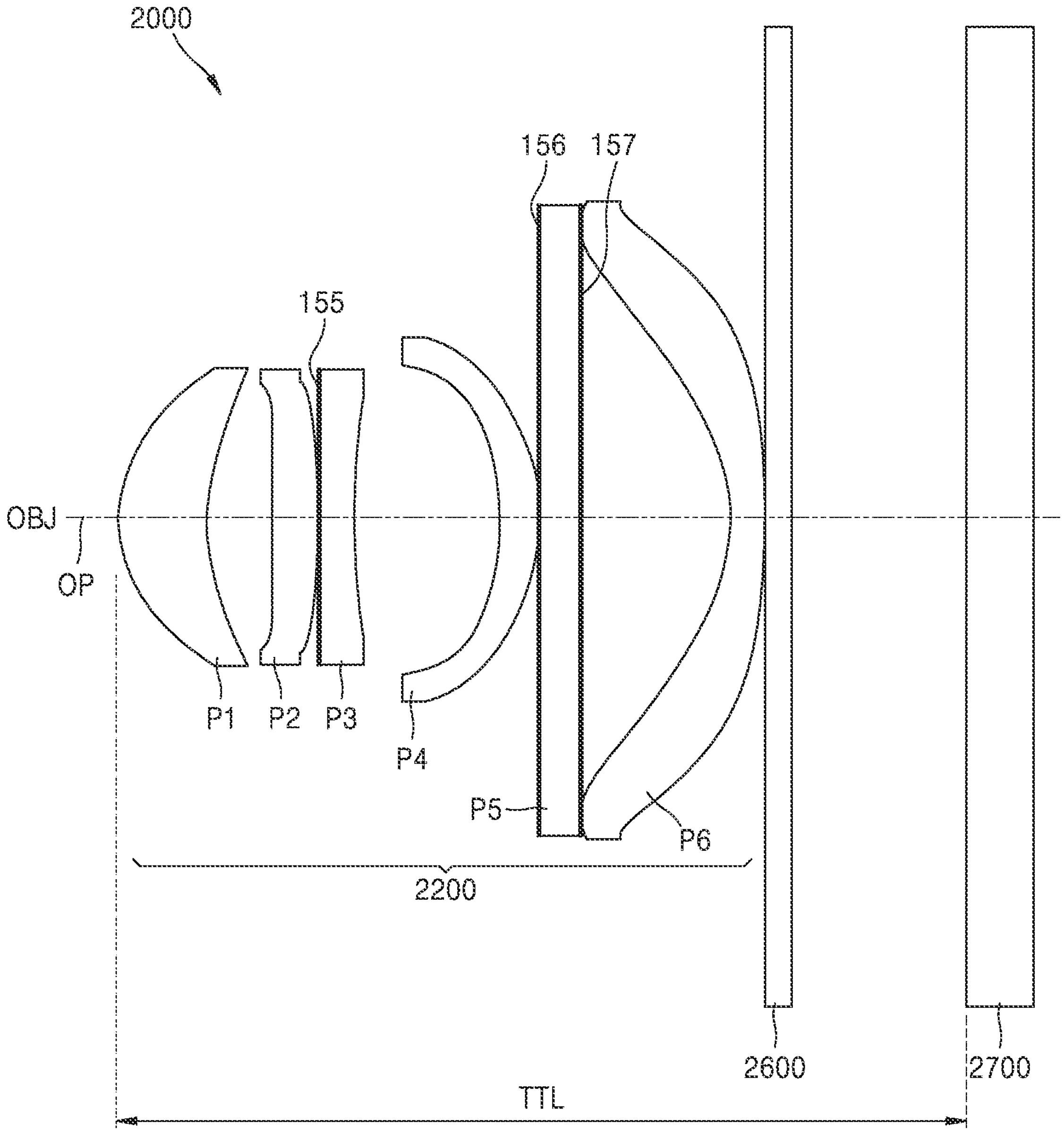
FIG. 13 illustrates an imaging lens and a configuration and an optical arrangement of an imaging apparatus including the imaging lens according to an example embodiment.

FIG. 13 illustrates an imaging lens and a configuration and an optical arrangement of an imaging apparatus including the imaging lens according to another example embodiment.

An imaging apparatus 2000 includes an imaging lens 2200, and an image sensor 2700 for converting an optical image of an object OBJ, which is generated by the imaging lens 2200, into an electric signal. An infrared cut-off filter 2600 may be provided between the imaging lens 2200 and the image sensor 2700.

The imaging lens 2200 includes a first lens element P1, a second lens element P2, a third lens element P3, a fourth element P4, a fifth lens element P5, and a sixth lens element P6 that are sequentially arranged along the optical axis OP in a direction from the object OBJ toward the image sensor 2700.

The first lens element P1, the second lens element P2, the fourth lens element P4, and the sixth lens element P6 are refractive-type lenses, and the third lens element P3 and the fifth lens element P5 are meta lenses.

The third lens element P3 includes a first metasurface 155, and the fifth lens element P5 includes a second metasurface 156 and a third metasurface 157.

The third lens element P3 is arranged at a pre-medium position of a light path along an arrangement order of the plurality of lens elements provided in the imaging lens 2200 and includes the first metasurface 155 including a plurality of nanostructures having preset shape and arrangement for correcting a chromatic aberration of the imaging lens 2200. The nanostructures described in relation to FIGS. 2A through 4C may be provided in the first metasurface 155. The third lens element P3 may mainly correct longitudinal chromatic aberrations.

The fifth lens element P5 is arranged at a post-medium position of the light path along an arrangement order of the plurality of lens elements provided in the imaging lens 2200 and may correct lateral chromatic aberrations of the imaging lens 2200. At least one of the meta lenses ML 100, 101, 102, and 103 shown in FIGS. 1 through 10, and a modification and a combination thereof may be used as the fifth lens element P5. Hereinafter, the fifth lens element P5 will be illustrated and described as including two metasurfaces, as illustrated in FIGS. 8 and 9.

The fifth lens element P5 includes the second metasurface 156 and the third metasurface 157 including a plurality of nanostructures having preset shape and arrangement to correct the chromatic aberrations of the imaging lens 2200 and reduce generation of the geometric aberrations as much as possible. The fifth lens element P5 may mainly correct lateral chromatic aberrations of the imaging lens 2200.

A longitudinal chromatic aberration indicates an aberration in which lights of different wavelengths incident in parallel to an optical axis are focused on other positions according to a longitudinal direction, for example, a direction of the optical axis, and is an aberration mainly shown in light incident to the paraxial region in parallel to the optical axis. This type of incident light is mainly found in a former half of the imaging lens 2200.

A lateral chromatic aberration indicates an aberration in which lights of different wavelengths incident obliquely to the optical axis are focused on other positions in a lateral direction, for example, a direction perpendicular to the optical axis. This type of aberration is an aberration shown in light incident from a latter half of the imaging lens 2200 in various and relatively greater incidence angles than incidence angle at the former half of the imaging lens 2200.

Figure 14:
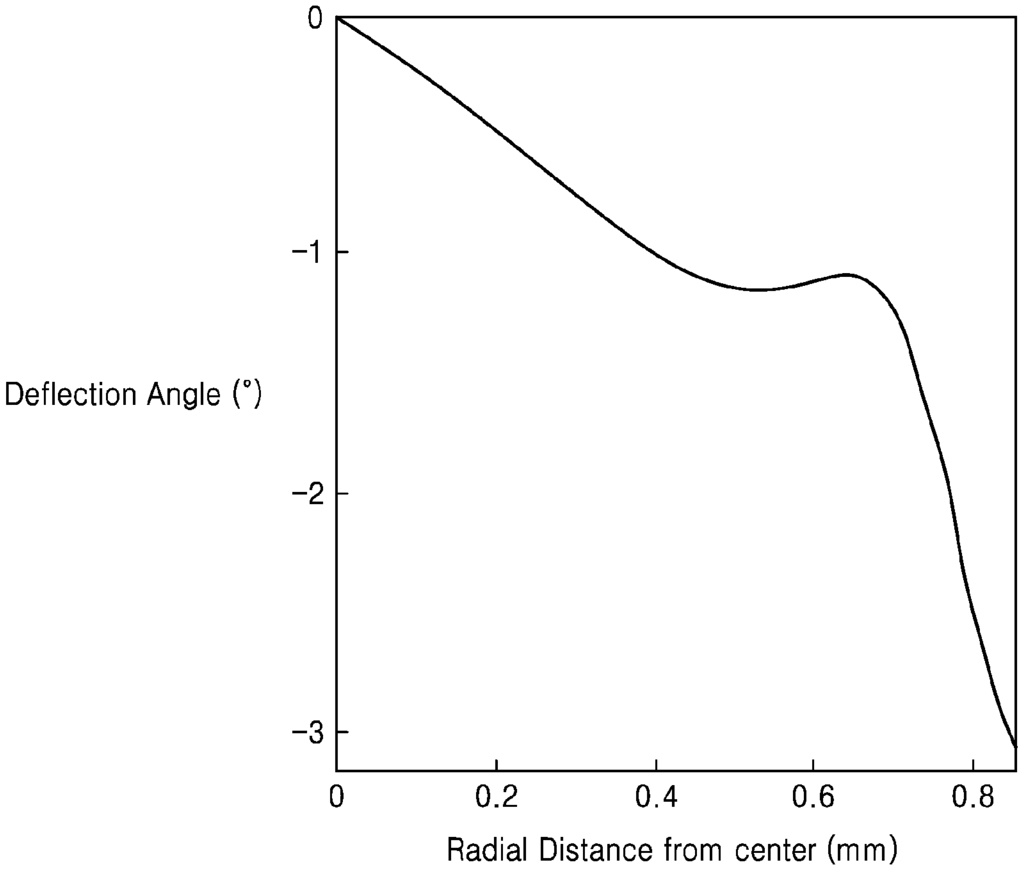
FIG. 14 is a graph showing a distribution of deflection angles of a metasurface provided in a third lens element of the imaging lens of FIG. 13.

FIG. 14 is a graph showing a distribution of deflection angles of the first metasurface 155 included in the third lens element P3 of the imaging lens 2200 in FIG. 13.

The graph is related to the first metasurface 155 above the optical axis OP, and shows a range from a center to an effective radius. Referring to the graph, a range from the center to a preset distance indicates a negative diffraction angle, which is a direction toward the optical axis OP as described with reference to FIG. 7. A size of angle tends to increase away from the optical axis OP and monotonously increase to at least a region, for example, the size of angle shows a monotonous increase to a region reaching half an effective radius of the first metasurface 155. Although the graph in FIG. 14 is shown as having an inflection point, but it is merely illustrative and embodiments are not limited thereto.

As shown in the graph of FIG. 14, the first metasurface 155 has a positive refractive power. The metasurface 155 having a positive refractive power shows an aberration making a focus distance of light of a long wavelength smaller than light of light of a short wavelength, and the property is opposite to that of a common refractive lens. Accordingly, the first metasurface 155 may correct an aberration generated while passing through other refractive lenses, for example, the first lens element P1 and the second lens element P2.

At a position of the first metasurface 155, for example, at a position of the former half in an arrangement of all components of the imaging lens 2200, incident light is mostly in parallel to the optical axis OP or forms a small angle with the optical axis OP. Accordingly, the first metasurface 155 mainly corrects longitudinal chromatic aberrations.

As a chromatic aberration tendency shown by the first metasurface 155 is very sensitive to diffraction angles, a range of change in diffraction angles may be set small to be within several degrees)(°. For example, in an effective radius, a range of change in the diffraction angles may be in a range from about −5° to about +5°. However, the embodiments are not limited thereto. The first metasurface 155 may exhibit a positive refractive power that is very weak.

Figure 15:
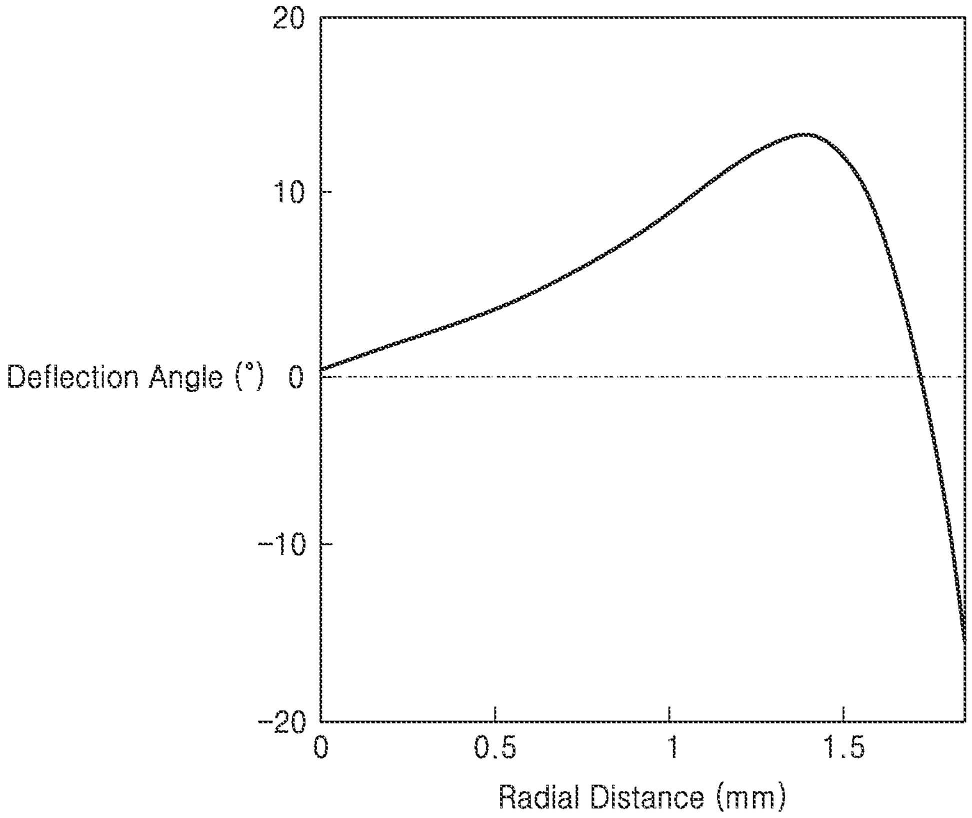
FIG. 15 is a graph showing a distribution of deflection angles of a metasurface provided in a fifth lens element of the imaging lens of FIG. 13.
Figure 16:
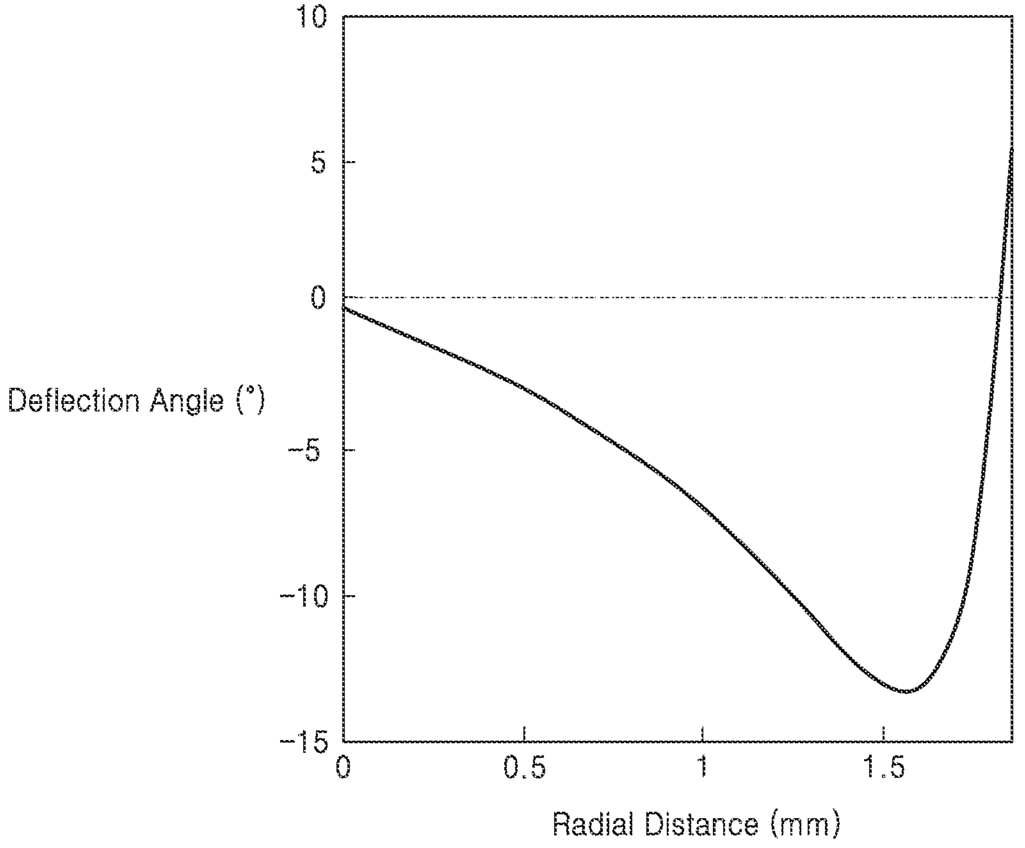
FIG. 16 is a graph showing a distribution of deflection angles of another metasurface provided in the fifth lens element of the imaging lens of FIG. 13.

FIGS. 15 and 16 are graphs respectively showing distribution of deflection angles of the second metasurface 156 and the third metasurface 157 provided in the fifth lens element P5 of the imaging lens 1200 of FIG. 12.

The graph of FIG. 15, which is related to the second metasurface 156 above the optical axis OP, shows a range from a center to an effective radius. Referring to the graph, a range from the center to a preset distance shows a positive diffraction angle, which is a direction away from the optical axis OP as described with reference to FIG. 7. The size of an angle increases to a preset range away from the optical axis OP. The preset range may be about a range including half the effective radius of the second metasurface 156. In this region, the second metasurface 156 has a negative refractive power. The graph of FIG. 15 shows that a sign of the diffraction angle is changed away from the radius direction and the second metasurface 156 has a positive refractive power at a peripheral portion. However, this is merely an example and the second metasurface 156 is not limited thereto. The second metasurface 156 may have a negative refractive power in general.

The graph shown in FIG. 16, which is related to the third metasurface 157 above the optical axis OP, shows a range from a center to an effective diameter. Referring to the graph, a range from the center to a preset distance shows a negative refractive angle, which is a direction toward the optical axis OP as described with reference to FIG. 7. A magnitude of angle tends to increase from a preset range away from the optical axis OP. The preset range may be about a range including half the effective radius of the third metasurface 157. In this region, the third metasurface 157 has a positive refractive power. The graph of FIG. 16 shows that a sign of the diffraction angle changes away in the radius direction and the third metasurface 157 has a negative refractive power at a peripheral portion. However, this is merely an example and the third metasurface 157 is not limited thereto. The third metasurface 157 may have a positive refractive power in general.

The second metasurface 156 and the third metasurface 157 provided in the fifth lens element P5 have properties of diffraction angle distribution opposite to each other and do not have serious impacts on light passage when the fifth lens element P5 corrects chromatic aberrations, and thus, geometric aberrations fifth lens element P5 are hardly generated.

At positions of the second metasurface 156 and the third metasurface 157, for example, at the latter half position in the arrangement of the entire components of the imaging lens 2200, the incident light has an incident angle compared to incident angle at the former half of the imaging lens 2200. Accordingly, the fifth lens element P5 including the second metasurface 156 and the third metasurface 157 mainly corrects lateral chromatic aberrations.

In the imaging lens 2200, two meta lenses respectively arranged in the former half and the latter half, for example, the third lens element P3 and the fifth lens element P5, may respectively correct different aberrations, and additional aberrations may be hardly generated in this process. In addition, thickness of the meta lens, which has a thickness much smaller than that of a common refractive lens, may contribute to reduce an optical total length TTL.

Figure 17:
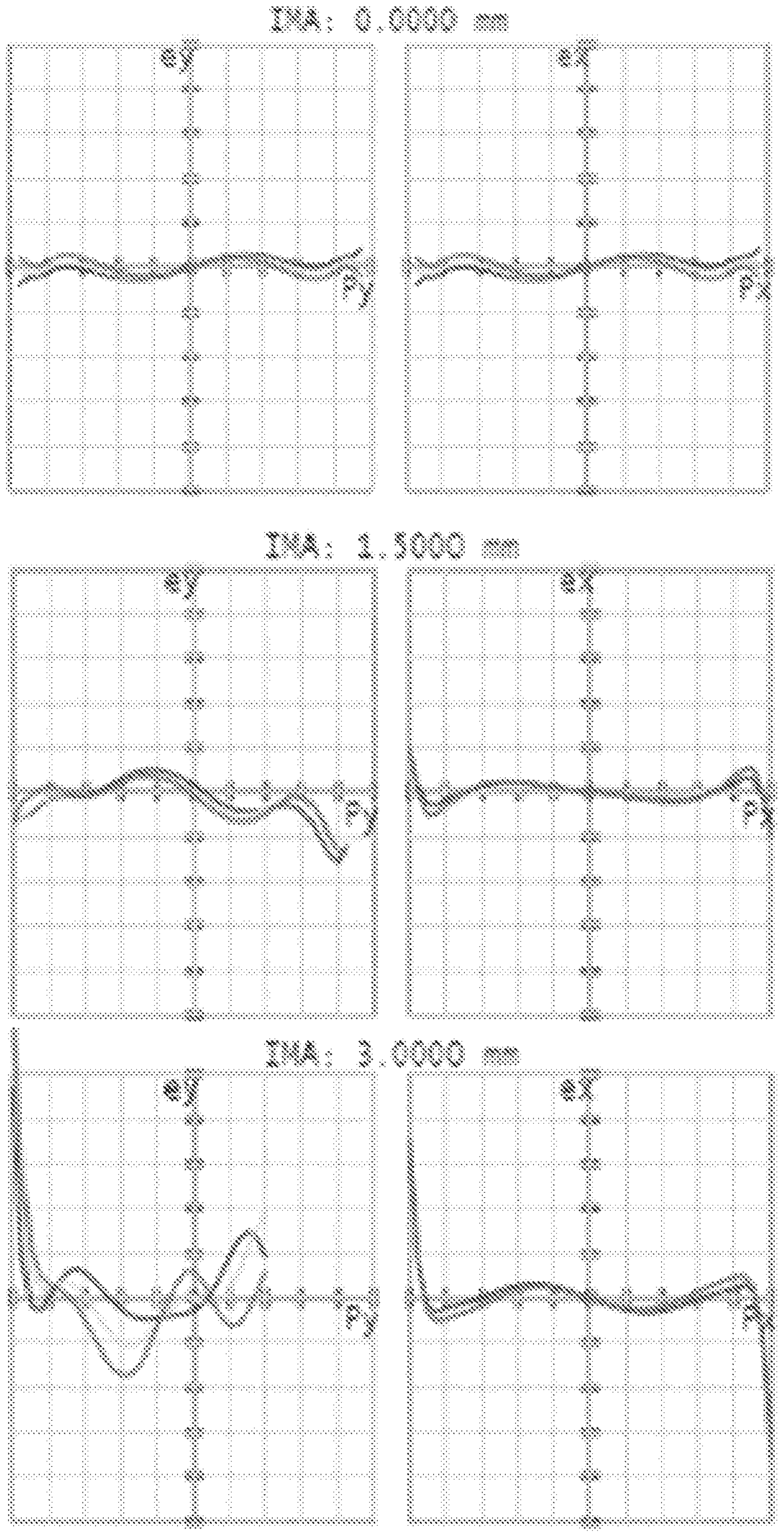
FIG. 17 shows an aberration diagram with respect to the imaging apparatus of FIG. 13.

FIG. 17 shows an aberration diagram with respect to the imaging apparatus of FIG. 13.

The aberration diagram shows a ray fan with respect to red light, green light, and blue light and aberrations ex and ey in respective directions are shown in the x direction Px and the y direction Py at three image height positions (0 mm, 1.5 mm, and 3.0 mm) on an image sensor. The aberration diagram shows that the aberrations of the imaging apparatus of the example embodiment is very low.

According to the example embodiments as illustrated in FIG. 17, an optical total length of the imaging apparatus 2000 is 3.6 mm, and an optical system of a very small thickness capable of controlling overall aberrations may be implemented.

The imaging lens 2200 shown in FIG. 13 is an example including a plurality of refractive lenses and two meta lenses for correcting different aberrations according to incident positions. However, embodiments are not limited thereto, and an arrangement type or a total number of lens elements may be modified. For example, another example embodiment may be implemented, in which a meta lens arranged in the former half of the arrangement of all lens elements corrects the longitudinal chromatic aberrations of the imaging lens and a meta lens arranged in the latter half corrects the lateral chromatic aberrations.

The above-described imaging apparatuses 1000 and 2000 may further include a memory, a processor, an actuator, an illuminator, a display, and the like. The actuator may, for example, drive positions of the lens elements constructing the imaging lens 1200 and 2200 and adjust a separation distance between the lens elements for zooming and/or autofocus (AF). The illuminator may radiate visible ray and/or infrared ray to the object. The processor, which processes signals of the image sensor and controls the imaging apparatuses 1000 and 2000 in general, may control drive of the actuator or the illuminator. A code or data for execution of the processor may be stored in the memory, and images formed in the imaging apparatuses 1000 and 2000 may be displayed on the display.

The above-described imaging apparatuses 1000 and 2000 may be mounted in various electronic devices. For example, the above-described imaging apparatuses 1000 and 2000 may be mounted in electronic devices such as a smart phone, a wearable device, an Internet of Things (IoT) device, home appliances, a tablet personal computer (tablet PC), a personal digital assistant (PDA), a portable multimedia player (PMP), a navigation device, a drone, an advanced drivers assistance system (ADAS), and the like.

The above-described meta lens, which includes two lens surfaces, may reduce generation of geometric aberrations as much as possible and correct chromatic aberrations by applying a metasurface to at least one of the two lens surfaces.

The above-described meta lens may be applied as an imaging lens having an improved chromatic aberration, in combination with a common refractive lens.

The above-described meta lens may be combined to a common refractive lens with an additional metasurface to construct an imaging lens. The imaging lens may correct different types of aberrations at a plurality of positions at which metasurfaces are placed.

The above-described imaging lens may be used various electronic apparatuses such as an imaging apparatus.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in forms and details may be made therein without departing from the spirit and scope as defined by the following claims.

What is claimed is:

1. An imaging lens comprising a plurality of lens elements, the imaging lens comprising:
- a plurality of refractive lenses;
- a first meta lens provided in a position of a light path before a medium position along an arrangement order of the plurality of lens elements, the first meta lens comprising a first metasurface comprising a plurality of nanostructures, wherein the arrangement order is in a direction toward an image sensor corresponding to the imaging lens;
- a second meta lens, provided at a position of the light path after the medium position along the arrangement order of the plurality of lens elements,
- wherein the second meta lens comprises:
  - a first lens surface; and
  - a second lens surface opposite to the first lens surface,
- wherein at least one of the first lens surface and the second lens surface is a metasurface comprising a plurality of nanostructures having a sub-wavelength dimension,
- wherein the first lens surface has a first deflection property based on positions of incident light in at least some regions of the first lens surface and the second lens surface has a second deflection property based on positions of incident light in at least some regions of the second lens surface,
- wherein the first deflection property is different from the second deflection property,
- wherein the first meta lens is configured to correct longitudinal chromatic aberrations of the imaging lens, and
- wherein the second meta lens is configured to correct lateral chromatic aberrations of the imaging lens.

2. The imaging lens of claim 1, wherein a shape distribution of nanostructures of the first metasurface is configured such that the first meta lens operates as a convex lens in a range from a center to half of an effective diameter of the first meta lens.

3. The imaging lens of claim 1, wherein a range of an angle at which the first meta lens deflects incident light is from −5° to +5°.

4. The imaging lens of claim 1, wherein the second meta lens has an integral structure comprising a substrate with a first surface and a second surface that is opposite to the first surface.

5. The imaging lens of claim 4, wherein the second meta lens comprises:
- a second metasurface comprising a plurality of nanostructures arranged in a second shape distribution on the first surface, and
- a third metasurface comprising a plurality of nanostructures arranged in a third shape distribution that is different from the second shape distribution on the second surface.

6. The imaging lens of claim 5, wherein with respect to a central wavelength $\lambda 0$ of an operation wavelength band of the second meta lens, a distance between the second metasurface and the third metasurface is greater than 10020 and less than 1,00020.

7. The imaging lens of claim 5, wherein the at least some regions of the second meta lens comprises regions from centers of the second metasurface and the third metasurface to half of each of effective diameters of the second metasurface and the third metasurface.

8. The imaging lens of claim 5, wherein the second metasurface is configured to deflect incident light in a direction toward an optical axis, and a magnitude of a deflection angle gradually increases from a center to a periphery of the second metasurface in a radial direction of the second metasurface, and wherein the third metasurface is configured to deflect incident light in a direction away from the optical axis, and a magnitude of a deflection angle gradually increases from a center to a periphery of the third metasurface in a radial direction of the third metasurface.

9. The imaging lens of claim 5, wherein at two opposite positions of the second metasurface and the third metasurface, a deflection direction of incident light on the second metasurface and a deflection direction of incident light on the third metasurface are opposite to each other with respect to a direction of an optical axis of the imaging lens.

10. The imaging lens of claim 5, wherein at two opposite positions of the second metasurface and the third metasurface, a difference between a deflection direction of incident light on the second metasurface and a deflection direction of incident light on the third metasurface is in a range from −30° to +30°.

11. The imaging lens of claim 5, wherein the second metasurface has a positive refractive power and the third metasurface has a negative refraction power.

12. The imaging lens of claim 1, wherein with respect to a central wavelength $\lambda 0$ of an operation wavelength band of the second meta lens, a distance between the first lens surface and the second lens surface is greater than $100\lambda 0$ and less than $1{,}000\lambda 0$.

13. The imaging lens of claim 1, wherein the first lens surface is the metasurface comprising the plurality of nanostructures, and wherein the second lens surface is a refractive-type lens surface of a refractive lens having a curved surface.

14. The imaging lens of claim 13, wherein the refractive-type lens surface has a concave shape, and wherein a shape distribution of the plurality of nanostructures is configured such that the metasurface has a positive refractive power.

15. The imaging lens of claim 13, wherein the plurality of nanostructures are provided on a surface of the refractive lens opposite to the curved surface.

16. The imaging lens of claim 1, wherein the plurality of nanostructures comprise:

a column-shape structure comprising a material having a refractive index different from a refractive index of a neighboring material, or a hole structure engraved inside of a medium layer with a preset refractive index in a column structure.

17. The imaging lens of claim 1, wherein the plurality of nanostructures comprise a nanostructure having a stack structure, the stack structure comprising:

a first layer comprising a column-shape structure comprising a material having a refractive index different from a refractive index of a neighboring material; and a second layer comprising a hole structure engraved inside of a medium layer with a preset refractive index in a column structure.

18. An imaging lens comprising a plurality of lens elements, the imaging lens comprising:

a plurality of refractive lenses;

a first meta lens provided in a position of a light path before a medium position along an arrangement order of the plurality of lens elements, the first meta lens comprising a first metasurface comprising a plurality of nanostructures, wherein the arrangement order is in a direction toward an image sensor corresponding to the imaging lens;

a second meta lens, provided at a position of the light path after the medium position along the arrangement order of the plurality of lens elements, wherein the second meta lens comprises:

a first lens surface; and a second lens surface opposite to the first lens surface, wherein at least one of the first lens surface and the second lens surface is a metasurface comprising a plurality of nanostructures having a sub-wavelength dimension, wherein the first lens surface has a first deflection property based on positions of incident light in at least some regions of the first lens surface and the second lens surface has a second deflection property based on positions of incident light in at least some regions of the second lens surface, wherein the first deflection property is different from the second deflection property, wherein the second meta lens has an integral structure comprising a substrate with a first surface and a second surface that is opposite to the first surface, wherein the second meta lens comprises:

a second metasurface comprising a plurality of nanostructures arranged in a second shape distribution on the first surface, and a third metasurface comprising a plurality of nanostructures arranged in a third shape distribution that is different from the second shape distribution on the second surface, and wherein the second metasurface and the third metasurface are further configured such that the second meta lens does not have a refractive power with respect to light in a green wavelength band.

19. An imaging device comprising:

an imaging lens comprising a plurality of lens elements; and an image sensor configured to convert an optical image formed by the imaging lens into an electric signal, wherein the imaging lens comprises:

a plurality of refractive lenses;

a first meta lens provided in a position of a light path before a medium position along an arrangement order of the plurality of lens elements, the first meta lens comprising a first metasurface comprising a plurality of nanostructures, wherein the arrangement order is in a direction toward the image sensor corresponding to the imaging lens;

a second meta lens, provided at a position of the light path after the medium position along the arrangement order of the plurality of lens elements, wherein the second meta lens comprises:

a first lens surface; and a second lens surface opposite to the first lens surface, wherein at least one of the first lens surface and the second lens surface is a metasurface comprising a plurality of nanostructures having a sub-wavelength dimension, wherein the first lens surface has a first deflection property based on positions of incident light in at least some regions of the first lens surface and the second lens surface has a second deflection property based on positions of incident light in at least some regions of the second lens surface, wherein the first deflection property is different from the second deflection property, wherein the first meta lens is configured to correct longitudinal chromatic aberrations of the imaging lens, and wherein the second meta lens is configured to correct lateral chromatic aberrations of the imaging lens.

* * * * *